United States Patent
Takahashi et al.

(10) Patent No.: US 11,481,445 B2
(45) Date of Patent: Oct. 25, 2022

(54) ANSWER GENERATING DEVICE AND NON-TRANSITORY COMPUTER READABLE MEDIUM STORING PROGRAM

(71) Applicant: FUJIFILM BUSINESS INNOVATION CORP., Tokyo (JP)

(72) Inventors: Takumi Takahashi, Kanagawa (JP); Motoki Taniguchi, Kanagawa (JP); Tomoki Taniguchi, Kanagawa (JP); Tomoko Ohkuma, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 247 days.

(21) Appl. No.: 17/001,885

(22) Filed: Aug. 25, 2020

(65) Prior Publication Data

US 2021/0279288 A1 Sep. 9, 2021

(30) Foreign Application Priority Data

Mar. 5, 2020 (JP) .............................. JP2020-038077

(51) Int. Cl.
G06F 16/9032 (2019.01)
G06F 40/284 (2020.01)
G06F 40/35 (2020.01)

(52) U.S. Cl.
CPC ...... *G06F 16/90332* (2019.01); *G06F 40/284* (2020.01); *G06F 40/35* (2020.01)

(58) Field of Classification Search
CPC ... G06F 16/90332; G06F 40/35; G06F 40/285
See application file for complete search history.

(56) References Cited

FOREIGN PATENT DOCUMENTS

| JP | 2019-191827 A | 10/2019 |
| JP | 2019-220142 A | 12/2019 |
| WO | 2019/208070 A1 | 10/2019 |
| WO | 2019/244803 A1 | 12/2019 |

OTHER PUBLICATIONS

Makoto, Conclusion-Supplement Answer Generation for Non-Factoid Questions, 2019, arXiv, whole document (Year: 2019).*
Pranav Rajpurkar et al. "SQuAD: 100,000+ Questions for Machine Comprehension of Text". Proceedings of the 2016 Conference on Empirical Methods in Natural Language Processing, Nov. 1-5, 2016, pp. 2383-2392.

(Continued)

*Primary Examiner* — Sonia L Gay
(74) *Attorney, Agent, or Firm* — Oliff PLC

(57) ABSTRACT

An answer generating device includes: an input that receives an input of analysis target data which is data to be questioned and analyzed; a processor; and an output. The processor being configured to, upon input of the question and the analysis target data and by execution of a program, extract answers to the question from the analysis target data using plural single answer models prepared in advance, the answers each being extracted independently for each of the plural single answer models, calculate a frequency of appearance of each of tokens in the extracted answers, and extract a single answer or multiple answers based on the frequency of appearance, and output the single answer or multiple answers to the output.

20 Claims, 6 Drawing Sheets

---

Context:

(...) Oakland would get the early lead in the first quarter as quarterback JaMarcus Russell completed a 20-yard touchdown pass to rookie wide receiver Chaz Schilens . (...)

Question: *Who threw the longest pass?*

Ground Truth: Russell

(56) References Cited

OTHER PUBLICATIONS

Minjoon Seo et al. "Bi-Directional Attention Flow for Machine Comprehension". Conference Paper at ICLR 2017, pp. 1-13.
Adams Wei Yu et al. "Qanet: Combining Local Convolution With Global Self-Attention for Reading Comprehension". Conference Paper at ICLR 2018, pp. 1-16.
Jacob Devlin et al. "Bert: Pre-Training of Deep Bidirectional Transformers for Language Understanding". Proceedings of NAACL-HLT 2019, pp. 4171-4186.
Pranav Rajpurkar et al. "Know What You Don't Know: Unanswerable Questions for SQuAD". Proceedings of the 56th Annual Meeting of the Association for Computational Linguistics (Short Papers), Jul. 15-20, 2018, pp. 784-789.
Dheeru Dua et al. "Drop: A Reading Comprehension Benchmark Requiring Discrete Reasoning Over Paragraphs". Proceedings of NAACL-HLT 2019, pp. 2368-2378.
Minghao Hu et al. "A Multi-Type Multi-Span Network for Reading Comprehension That Requires Discre Ie Reasoning". Proceedings of the 2019 Conference on Empirical Methods in Natural Language Processing and the 9th International Joint Conference on Natural Language Processing, Nov. 3-7, 2019, pp. 1596-1606.
Avia Efrat et al. "Tag-Based Multi-Span Extraction in Reading Comprehension". 2019.

\* cited by examiner

FIG. 1

| Context: |
|---|
| (...) Oakland would get the early lead in the first quarter as quarterback JaMarcus Russell completed a 20-yard touchdown pass to rookie wide receiver Chaz Schilens . (...) |
| Question: Who threw the longest pass? |
| Ground Truth: Russell |

FIG. 2

Context:
The first issue in 1942 consisted of denominations of 1, 5, 10 and 50 centavos and 1, 5, and 10 Pesos. The next year brought "replacement notes" of the 1, 5 and 10 Pesos while 1944 ushered in a 100 Peso note and soon after an inflationary 500 Pesos note. (...)

(SINGLE ANSWER QA)
Question: *What was the largest denomination of centavos in 1942?*
Ground Truth: 50

(MULTIPLE ANSWER QA)
Question: *Which new peso notes were the highest created by 1944?*
Ground Truths: 100 Peso note, 500 Pesos note

ANSWER GENERATING DEVICE AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-038077 filed on Mar. 5, 2020.

BACKGROUND

(i) Technical Field

The present disclosure relates to an answer generating device and a non-transitory computer readable medium storing a program.

(ii) Related Art

Techniques have been proposed in the past that, for given question and context, extract an appropriate answer from the context.

Japanese Unexamined Patent Application Publication No. 2019-220142 describes a device capable of answering a question which can be answered in terms of a polarity, with high accuracy in terms of a polarity. Based on inputted sentence and question sentence, a machine reading comprehension unit uses a learned reading model for estimating a range which is the basis for an answer to the question sentence in the sentence, and estimates a start point and an end point of the range. Based on the information obtained by the processing of the machine reading comprehension unit, a determining unit uses a learned determination model for determining whether or not the polarity of an answer to the question sentence is positive, and determines the polarity of the answer to the question sentence.

Japanese Unexamined Patent Application Publication No. 2019-191827 describes a device that implements answering to questions with high accuracy. The device has an answer generating unit that receives an input of a document and a question, and performs processing of generating an answer sentence to the question by a trained model using the words included in the union of sets of a predetermined first vocabulary and a second vocabulary configured by the words contained in the document and the question. The trained model includes a learned neural network which has learned about whether or not the words contained in the answer sentence are included in the second vocabulary, and when an answer sentence is generated, the probability of selecting a word included in the second vocabulary as a word contained in the answer sentence is increased or decreased by the learned neural network.

SUMMARY

Aspects of non-limiting embodiments of the present disclosure relate to a technique that, when a question and analysis target data are given, which is the data to be analyzed, such as a text related to the question, can extract multiple answers to the question.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an answer generating device including: an input that receives an input of analysis target data which is data to be questioned and analyzed; a processor; and an output, the processor being configured to, upon input of the question and the analysis target data and by execution of a program, extract answers to the question from the analysis target data using a plurality of single answer models prepared in advance, the answers each being extracted independently for each of the plurality of single answer models, calculate a frequency of appearance of each of tokens in the extracted answers, and extract single answer or multiple answers based on the frequency of appearance, and output the single or multiple answers to the output.

BRIEF DESCRIPTION OF THE DRAWINGS

Exemplary embodiments of the present disclosure will be described in detail based on the following figures, wherein:

FIG. 1 is an explanatory chart (#1) illustrating a context and a question;

FIG. 2 is an explanatory chart (#2) illustrating a context and a question;

DETAILED DESCRIPTION

Hereinafter, an exemplary embodiment of the present disclosure will be described based on the drawings by way of an example of text data used as analysis target data which is the data to be analyzed.

<Basic Principle>

First, the basic principle of the exemplary embodiment will be described.

A machine reading comprehension task has the aim of reading and comprehending a given text and answering a question. The machine reading comprehension task is an important task for assessing machines' capabilities of reading and understanding. For instance, in several extractive machine reading comprehension tasks, including SQuAD (Pranav Rajpurkar, Jian Zhang, Konstantin Lopyrev, and Percy Liang. SQuAD: 100,000+ questions for machine comprehension of text. In EMNLP, 2016.), when a question and a context are given, the most appropriate answer is extracted from the context.

FIG. 1 illustrates an example of a question and a context. "Russel" in the context is extracted as an appropriate answer to the question.

However, the conventional extractive machine reading comprehension is limited to answering to a question (hereinafter referred to as "single answer QA") in which a right answer to the question is based on a single answer range, and is unable to cope with answering to a question, which allows multiple answers at the same time.

Meanwhile, in order to extract answers in multiple ranges, some models have been proposed for extracting the right amount of appropriate answers. However, in each of these models, it is a precondition that learning is performed using data for machine reading comprehension, having multiple answer QA, and it is not practical to prepare such complicated data all the time.

When a model (hereinafter referred to as a "single answer model") which allows only a single answer is used, the number of answers estimated by the model is limited to one all the time. The inventors applied some single answer models to multiple answer QA, and have found that the answers outputted by the models are dispersed.

FIG. 2 illustrates an example of the single answer QA and an example of the multiple answer QA. The upper part of FIG. 2 is a context, the middle part includes an answer by a single answer model, and the lower part includes answers by multiple (specifically, 10) single answer models. The single answer model extracts "50" as an answer, whereas the multiple single answer models extract "100 peso note", and "500 peso note" as answers, and the answers are dispersed.

Similarly, when the matching rates of the answers of the models in single/multiple answer QA are compared, it is found that the single answer QA tends to have a higher matching rate.

Figure 3:
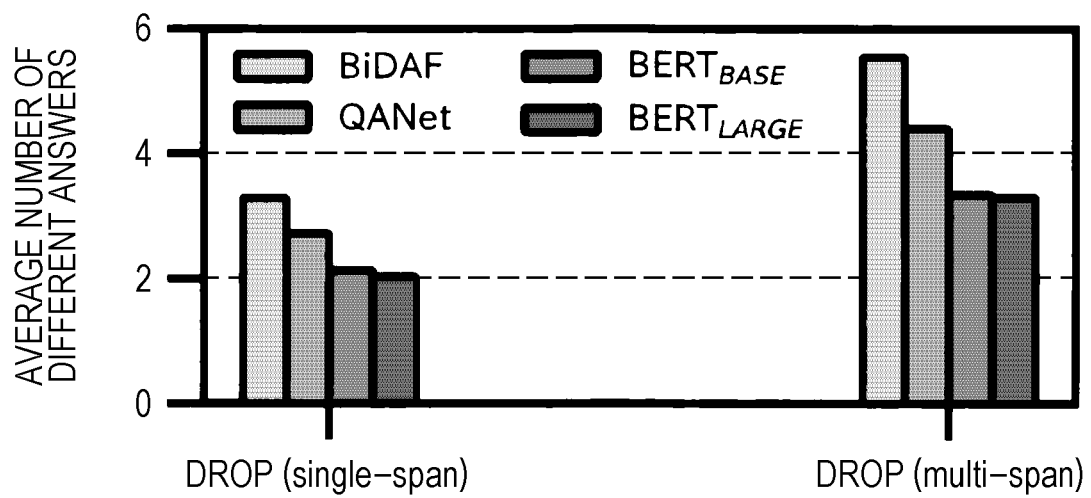
FIG. 3 is a graph illustrating an average number of differences in answer in single answer QA and multiple answer QA.

FIG. 3 illustrates the matching rates of the answers of the single answer QA and the multiple answer QA. In FIG. 3, DROP (single-span) shows the single answer QA, and DROP (multiple-span) shows the multiple answer QA. In addition, the vertical axis shows the average number of differences in answer, and when the answers estimated by the models perfectly match, the number of differences=1. The models are as follows.

BiDAF: (Minjoon Seo, Aniruddha Kembhavi, Ali Farhadi, and Hannaneh Hajishirzi. Bidirectional attention flow for machine comprehension. arXiv preprint arXiv:1611.01603, 2016.)

QANet: (Adams Wei Yu, David Dohan, Minh-Thang Luong, Rui Zhao, Kai Chen, Mohammad Norouzi, and Quoc V Le. Qanet: Combining local convolution with global self-attention for reading comprehension. arXiv preprint arXiv: 1804.09541, 2018.)

$BERT_{BASE}$: (Jacob Devlin, Ming-Wei Chang, Kenton Lee, and Kristina Toutanova. BERT: Pre-training of deep bidirectional transformers for language understanding. In NAACL, 2019.)

$BERT_{LARGE}$: (Jacob Devlin, Ming-Wei Chang, Kenton Lee, and Kristina Toutanova. BERT: Pre-training of deep bidirectional transformers for language understanding. In NAACL, 2019.)

Single answer QA models are 10 single answer QA models which have been trained in advance. As illustrated in FIG. 3, the single answer QA has a less average number of differences in answer, and a higher matching rate between answers. This is due to the restriction that each single answer model outputs only one answer which is considered to be the most appropriate. Therefore, when multiple answers are present in a context, answers extracted by several models are often different on multiple answer QA.

Thus, in the exemplary embodiment, the property that the answers of multiple single answer QA models do not particularly match in the multiple answer QA is utilized. Specifically, a model allowing multiple answers is implemented by combining multiple models, each of which can provide only a single answer.

A specific model is as follows.

The SQuAD, which is a dataset for typical extractive machine reading comprehension, has a purpose of extracting the most appropriate one answer from a context given for a question, and it was reported that a great number of models already provided the capability exceeding the reading comprehension ability of human. Subsequently, in SQuAD2.0 (Pranav Rajpurkar, Robin Jia, and Percy Liang. Know what you don't know: Unanswerable questions for SQuAD. In ACL, 2018.), a question was newly added to answer that answer is impossible when the answer to a question does not exist in the context. In DROP (Dheeru Dua, Yizhong Wang, Pradeep Dasigi, Gabriel Stanovsky, Sameer Singh, and Matt Gardner. DROP: A reading comprehension benchmark requiring discrete reasoning over paragraphs. In NAACL, 2019.), questions have been added in consideration of extraction (multiple answer QA) of multiple answer ranges, which has not been coped with. Although SQuAD2.0 has two patterns of single answer and no answer, in DROP, any number of answers, greater than or equal to 1, is called for, thus, it may be said that DROP is a dataset in which more various answer patterns are called for.

The multiple answer model by Hu et al. (Minghao Hu, Yuxing Peng, Zhen Huang, and Dongsheng Li. A multi-type multi-span network for reading comprehension that requires discrete reasoning. In EMNLP-IJCNLP, 2019.) predicts the number of answers to a question in a context, and repeatedly extracts an answer range based on the predicted number of answers, thus shows that multiple answer QA of DROP can be answered. Efrat et al. (Avia Efrat, Elad Segal, and Mor Shoham. Tag-based multi-span extraction in reading comprehension. arXiv preprint arXiv:1909.13375, 2019.) propose Multi-span Head in which answer extraction is considered to be a sequence labeling problem, and each token is assigned a BIO tag. Here, the "token" is a minimum constituent element of a sentence, such as a word or a character string. Although these models can provide multiple answers, data for machine reading comprehension including multiple answer QA to train multiple answer models needs to be sufficiently prepared in advance.

Thus, in the exemplary embodiment, multiple answer QA can be answered by combining multiple simple models, each of which only needs a dataset for extractive machine reading comprehension targeted for single answer only, and can provide a single answer. In the exemplary embodiment, the property that the answers of multiple models each able to provide only a single answer do not particularly match in the multiple answer QA is utilized.

Hereinafter, the exemplary embodiment will be described in detail.

<Configuration>

Figure 4:
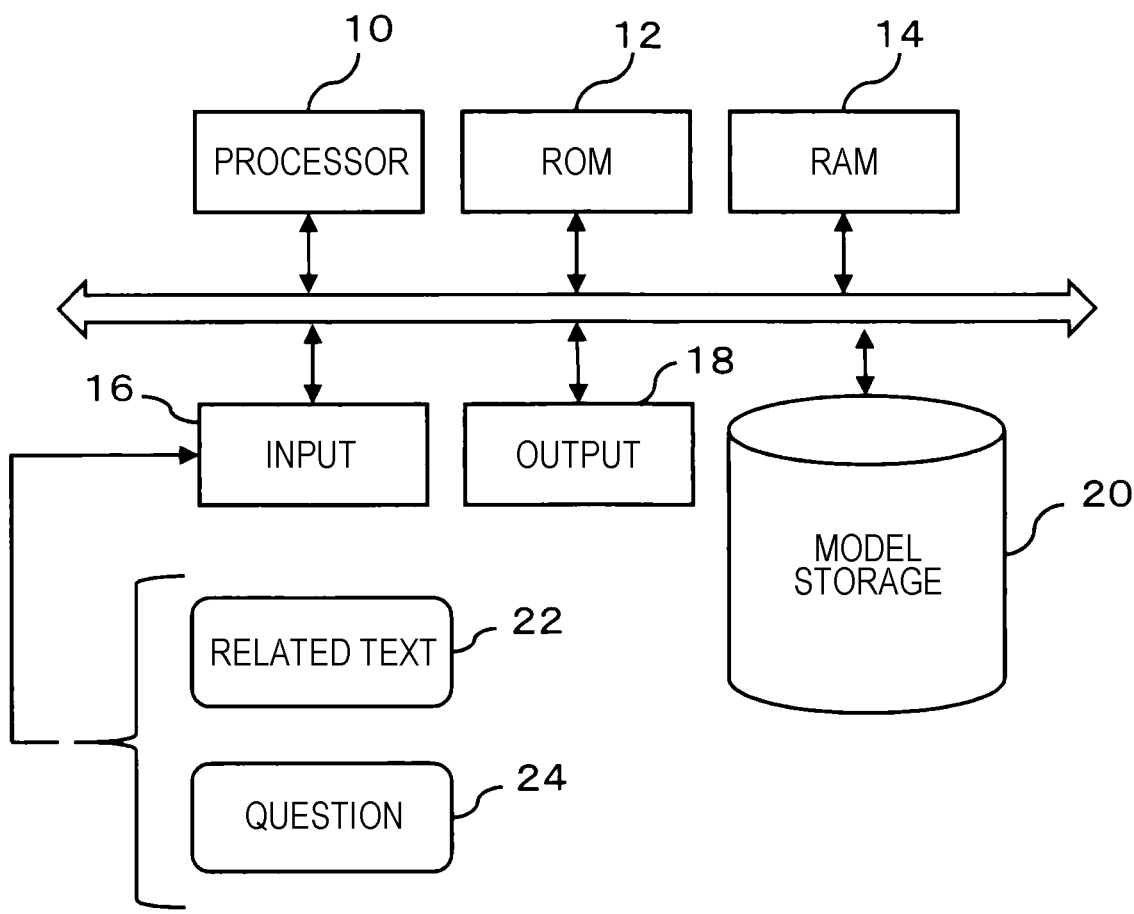
FIG. 4 is a configuration block diagram of an answer generating device in an exemplary embodiment.

FIG. 4 is a configuration block diagram of an answer generating device in the exemplary embodiment.

The answer generating device is comprised of a computer, and includes a processor 10, a ROM 12, a RAM 14, an input 16, an output 18, and a model storage 20.

The processor 10 reads a processing program stored in the ROM 12 or another program memory, and executes the program using the RAM 14 as a work area, thereby implementing a machine reading comprehension task. Based on inputted context and question, the processor 10 extracts appropriate single or multiple answers to the question from the context using a trained model stored in the model storage 20.

The input 16 is comprised of a keyboard and a communication interface, and receives an input of a context 22 and a question 24. The context 22 and the question 24 are basically text data, but may be image data. In the case of image data, the image data is converted to text data using an optical character recognition (OCR) technology.

The output 18 is comprised of a display and a communication interface, and outputs a result of the machine reading comprehension task performed by the processor 10, in other words, an answer extracted from the context.

The model storage 20 stores N different single answer models. The N different single answer models are each a trained model which has previously trained using only the dataset for the single answer QA. As a single answer model, for instance, a publicly known BERT (Jacob Devlin, Ming-Wei Chang, Kenton Lee, and Kristina Toutanova. BERT: Pre-training of deep bidirectional transformers for language understanding. In NAACL, 2019.) may be used. However, this is not always the case. The single answer model will be further described later.

In the embodiment above, the term "processor 10" refers to hardware in a broad sense. Examples of the processor 10 include general processors (e.g., CPU: Central Processing Unit), and dedicated processors (e.g., GPU: Graphics Processing Unit, ASIC: Application Integrated Circuit, FPGA: Field Programmable Gate Array, and programmable logic device). In the embodiment above, the term "processor 10" is broad enough to encompass one processor or plural processors in collaboration which are located physically apart from each other but may work cooperatively. The order of operations of the processor 10 is not limited to one described in the embodiment above, and may be changed.

Figure 5:
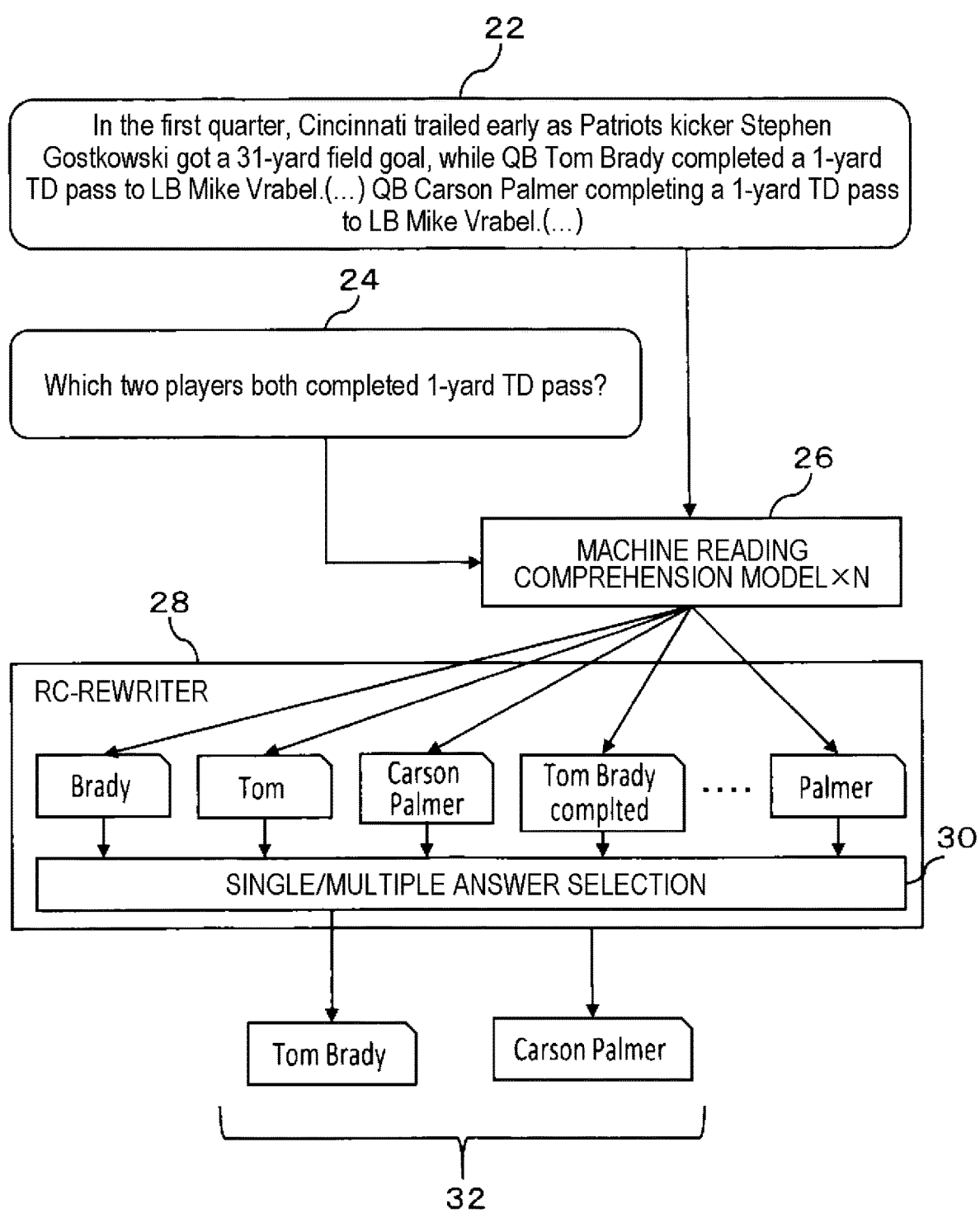
FIG. 5 is a functional block diagram of the exemplary embodiment.

FIG. 5 functionally illustrates the machine reading comprehension processing executed by the processor 10.

The processor 10 receives an input of the context 22 and the question 24. The context 22 is any context, and for instance, it is assumed that "In the first quarter, Cincinnati trailed early as Patriots kicker Stephen Gostkowski got a 31-yard field goal, while QB Tom Brady completed a 1-yard TD pass to LB Mike Vrabel. ( . . . ) QB Carson Palmer completing a 1-yard TD pass to LB Mike Vrabel. ( . . . )" The question 24 is also any question, and for instance, it is assumed that "Which two players both completed 1-yard TD pass ?" It is to be noted that the question is not limited to such a question that allows only one right answer, but allows multiple right answers (two right answers are allowed to the above-mentioned question).

A machine reading comprehension model 26 is formed of N different single answer models (M={$m_1$, . . . , $m_N$}), and these single answer models are trained on only a single answer QA in advance. For instance, when the publicly known BERT is used as a single answer model, a question Q and a context are inputted, and training is performed to output a probability distribution which represents a start point and an end point of an answer. N independent answer candidates are obtained from N different single answer models. Each of the answer candidates is a probability distribution which represents a start point and an end point. In FIG. 5, from the machine reading comprehension model 26, "Brady", "Tom", "Carson Palmer", "Tom Brady completed", . . .

"Palmer" each show a token at a start point and an end point, in other words, show that a word or a character string has been outputted. The N independent answer candidates from the N different single answer models are supplied to an RC-rewriter 28.

The RC-rewriter 28 includes a single/multiple answer selector 30 that finally selects the answers to be used from the N independent answer candidates. When the answer range is focused on a specific token (a character string or a word string) in a context, the single/multiple answer selector 30 determines that the target token gives the single answer, whereas when the answer range is dispersed over multiple tokens, the single/multiple answer selector 30 determines multiple answers, thereby performing answer selection. FIG. 5 shows that the answer range is determined to be dispersed over multiple tokens, and multiple answers "Tom Brady", "Carson Palmer"

are outputted as the final answers. Whether the answer range is focused on a specific token or dispersed over multiple tokens can be determined by calculating a matching rate between answers, and comparing the matching rate between answers with a predetermined threshold value.

Figure 6:
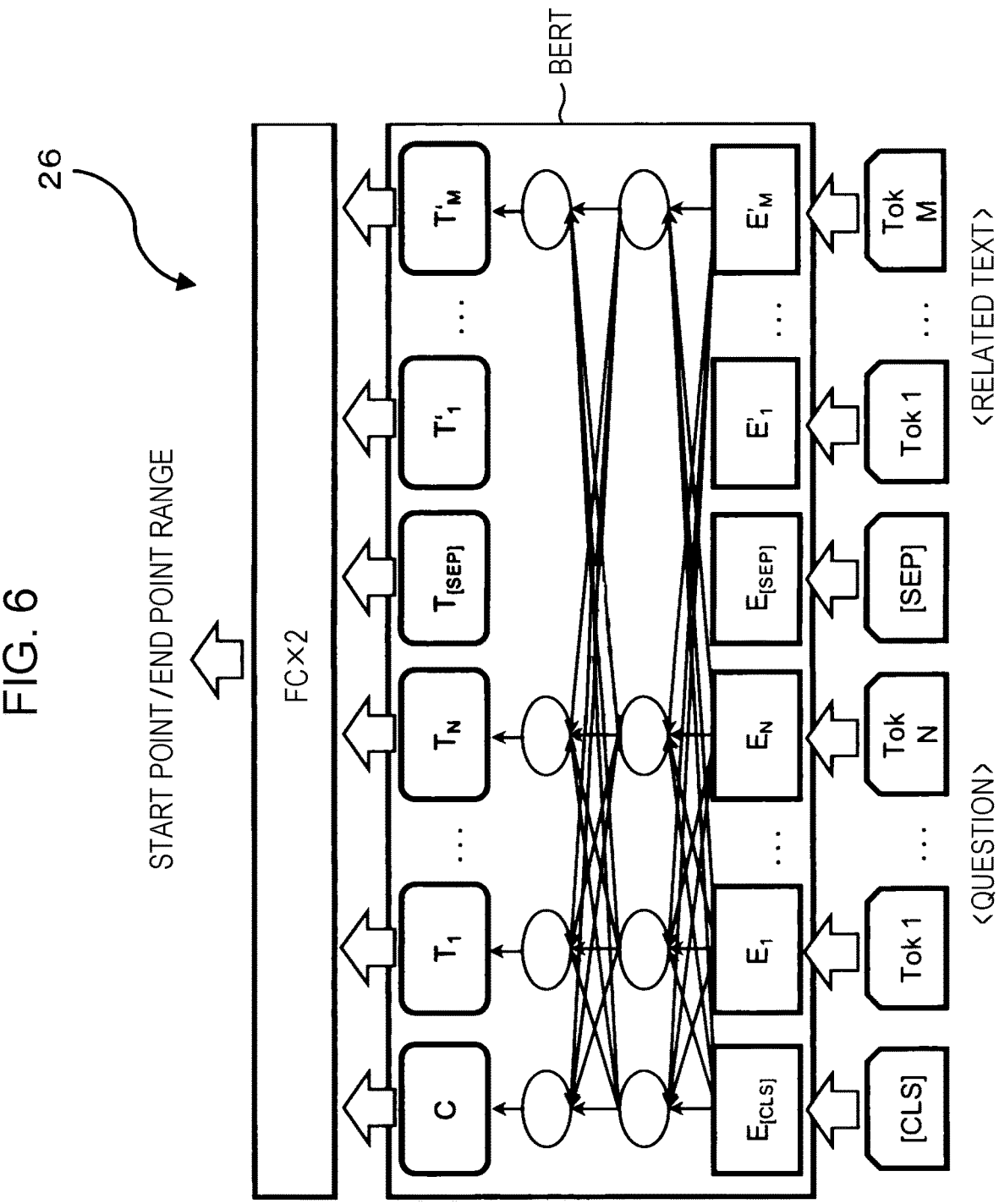
FIG. 6 is configuration diagram of a machine reading comprehension model in the exemplary embodiment.

FIG. 6 schematically illustrates the machine reading comprehension model 26. The machine reading comprehension model 26 is formed of N different single answer models M={$m_1$, . . . $m_N$}, and each model is trained on only the single answer QA dataset. In a single answer model based on the BERT, when a question Q and a context C are given, $$x=[CLS]Q[SEP]C[SEP]$$

is an input to the BERT. Here, [CLS] is a token showing the representation of the entire pair sentences. [SEP] shows a token for clarifying the division of an input pair. Thus, by inputting x to the BERT, a d-dimensional distributed representation H for a sequence of tokens having a length L is obtained as $$H \cdot R^{d \times L}$$

For extraction of an answer range, the probability distribution to predict the start point and the end point of an answer using two types of fully connected layers is calculated based on the following Expressions.

$$p_{start}=\mathrm{softmax}(W_s H+b_s)$$

$$P_{end}=\mathrm{softmax}(W_e H+b_e)$$

Here, Ws, We are weighted matrices, and bs, be are bias terms.

Finally, the single answer model $m_i$ extracts an answer $am_i$, where tokens which respectively maximize pstart and pend are the start point and the end point of an answer.

In this manner, extraction of an answer is based on the maximum value of the probability distribution, thus the single answer model $m_i$ always extracts only one answer regardless of the number of answers present in the context C in a latent manner. As described above, the N different single answer models of the machine reading comprehension model 26 outputs N independent answer candidates to the RC-rewriter 28.

When the answer range is focused on a specific token in the context C, the single/multiple answer selector 30 of the RC-rewriter 28 determines that the target token gives the single answer, whereas when the answer range is dispersed over multiple tokens, the single/multiple answer selector 30 determines multiple answers, thereby selecting answers.

Specifically, in order to calculate a matching rate of each answer first, for all tokens T={$t_1$, $t_2$, . . . } included in the context C, the frequency of appearance of each token in an answer candidate a.

The frequency of appearance of the token $t_i$ in the answer candidate a is calculated by the following Expression.

$$f_i = \sum_{a \in A} \text{match}(t_i, a),$$

$$\text{match}(t_i, a) = \begin{cases} 1 & (t_i \in a) \\ 0 & (t_i \notin a) \end{cases}$$

Applying this calculation to the all tokens in the context C gives a sequence $F=\{f_1, f_2, \ldots\}$ of the frequency of appearance of each token in the answer candidate a.

Subsequently, an appearance frequency F of each token in the answer candidate a is referred to, and the final answer a is obtained based on a threshold value u and a threshold value l which are two predetermined threshold values. Here, $u>1$, $u \geq 0.5 \times N$ More specifically, all tokens in the context C are selected based on the operation described below.

Operation 1: when $f_i \geq u$ is satisfied, $t_i$ is determined to be a token of a single answer, and is added to the final answer (single answer QA).

Operation 2: when $u > f_i \geq l$ is satisfied, $t_i$ is determined to be a token of multiple answers, and is added to the answer (multiple answer QA).

Operation 3: when $l > f_i$ is satisfied, $t_i$ is determined not to be a token of an answer.

By the operations 1 to 3 above, a single answer or multiple answers are obtained as the final answer.

For instance, let $$u = 0.9 \times N$$

$$l = 0.2 \times N,$$

when the appearance frequency $f_i \geq 0.9 \times N$, that is, the matching rate is higher than or equal to 90%, single answer QA is determined. When the appearance frequency $f_i$ is such that $0.9N > f_i \geq 0.2N$, that is, the matching rate is lower than 90% and higher than or equal to 20%, multiple answer QA is determined. Also, when the appearance frequency $f_i < 0.2 \times N$, that is, the matching rate is lower than 20%, no answer is determined.

In the operation 1 and the operation 2, when the same operation is repeatedly performed on consecutive multiple tokens T, each token is not individually added to the final answer, but a token having a maximum length of sequence is added to the final answer.

After the operation 1 is performed on $t_j$, when the processing performed on the $t_{j+1}$ is other than the operation 1, a token sequence obtained by the operation 1 is added to the final answer as a single answer, and selection of answer is terminated.

In the single/multiple answer selector 30 of the RC-rewriter 28, the answer candidates extracted by the machine reading comprehension model 26 are rewritten to obtain well-formed answers based on the frequency for each token, thus, as illustrated in FIG. 5, from individually extracted tokens "Tom",
"Brady",
"Tom Brady" as an answer can be formed.

<Processing Flowchart>

Figure 7:
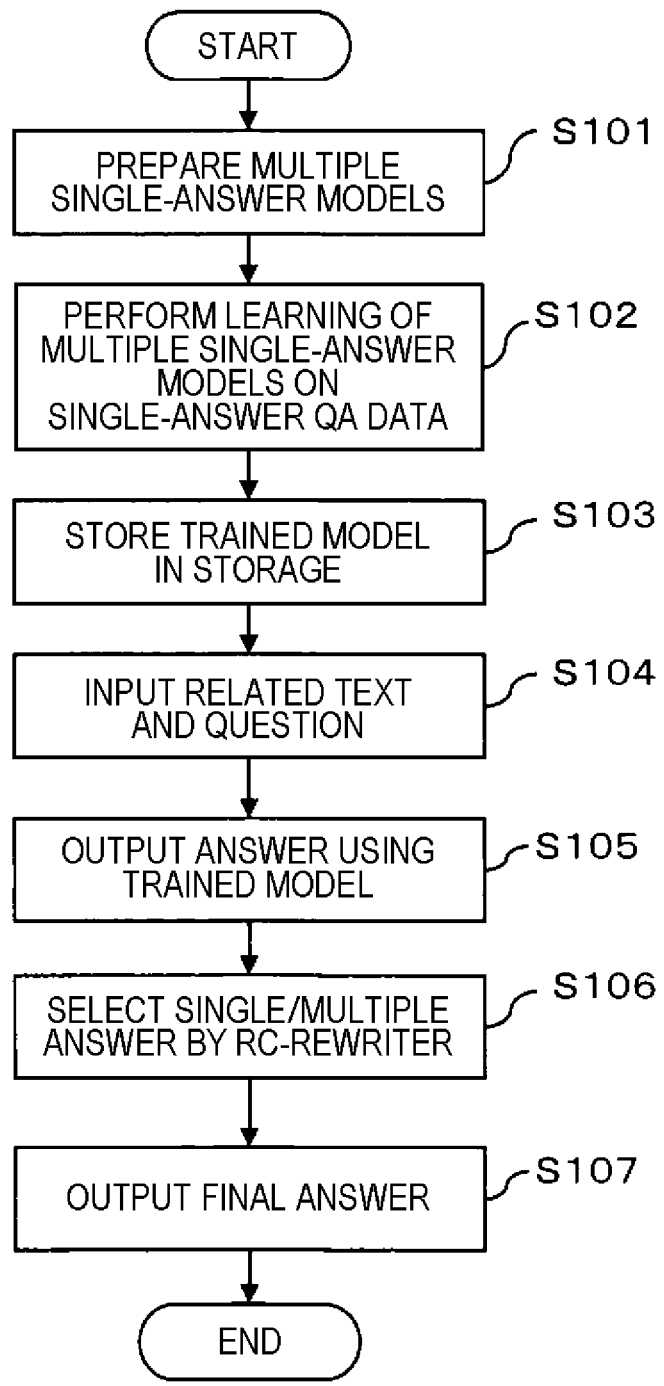
FIG. 7 is a flowchart of processing in the exemplary embodiment.

FIG. 7 illustrates a flowchart of processing in the exemplary embodiment. The processing in S101 to S103 is the learning processing of the models, and the processing in S104 to S107 is answer generation processing using trained models.

First, multiple N single answer models are prepared (S101). Although the number N and the type of single answer models are any number and type, for instance, 20 single answer models based on the BERT are prepared. It is to be noted that the single answer models may be of the same type or different types.

Next, for each of the prepared multiple single answer models, learning is performed using only the single answer QA dataset (S102). Specifically, a question and a context are inputted, and learning is performed so as to output a probability distribution which represents a start point and an end point of an answer. A trained model is stored in the storage (S103). After the learning processing is completed, the flow proceeds to answer generation processing subsequently.

First, a context and a question are inputted (S104).

Next, an answer is outputted using the trained model stored in the storage, specifically, the machine reading comprehension model 26 (S105). The N single answer models of the machine reading comprehension model 26 output N independent answer candidates.

Next, single/multiple answer is selected by the RC-rewriter 28 from the N answers outputted from the machine reading comprehension model 26. Specifically, all tokens $t_i$ in the context C are selected based on the below-described determination operations using two threshold values u and l.

Operation 1: when $f_i \geq u$ is satisfied, $t_i$ is determined to be a token of a single answer, and is added to the final answer (single answer QA).

Operation 2: when $u > f_i \geq l$ is satisfied, $t_i$ is determined to be a token of multiple answers, and is added to the answer (multiple answer QA).

Operation 3: when $l > f_i$ is satisfied, $t_i$ is determined not to be a token of an answer.

When single/multiple answer or no answer is selected as described above, a result of the selection is outputted as the final answer (S107).

Example

Among the datasets for the extractive machine reading comprehension included in the DROP (Dheeru Dua, Yizhong Wang, Pradeep Dasigi, Gabriel Stanovsky, Sameer Singh, and Matt Gardner. DROP: A reading comprehension benchmark requiring discrete reasoning over paragraphs. In NAACL, 2019.), a dataset with single answer is used as the single answer QA (single-span), and a dataset with two or more answers is used as the multiple answer QA (multi-span). The multiple answer QA of the DROP is not used as the training split, but is used at the time of evaluation. Thus, only the DROP (single-span) is used when training models.

Table 1 illustrates the statistical amounts of the single/multiple answer QA used in Example.

TABLE 1

| DATA SET | train | dev. |
|---|---|---|
| DROP (single-span) | 23,068 | 2,749 |
| DROP (multi-span) | — | 553 |

BiDAF, $QA_{Net}$, and BERT are used as the extractive machine reading comprehension models with a single answer. For BERT, $BERT_{BASE}$ and $BERT_{LARGE}$ which are previously trained models are used. In order to use as the machine reading comprehension model 26, 20 models, in which different seeds are set, are trained in advance. At the time of training, optimization by Adam is performed. Table 2 illustrates the parameters used in each model.

TABLE 2

|  | ♣ (BiDAF) | ◇ (QANet) | ▽ ($BERT_{BASE}$) | ♠ ($BERT_{LARGE}$) |
|---|---|---|---|---|
| PATCH SIZE | 60 | 32 | 12 | 24 |
| NUMBER OF EPOCHS | 50 | 50 | 10 | 5 |
| LEARNING RATE | $1e^{-3}$ | $1e^{-3}$ | $3e^{-5}$ | $3e^{-3}$ |
| MAXIMUM NUMBER OF TOKENS | 512 | 400 | 512 | 512 |

Two threshold values for the frequency of each token at the time of answer selection in the RC-rewriter 28 are set as follows.
u=0.9N
l=0.2N
It is to be noted that N corresponds to the number of models used in the machine reading comprehension model 26, and N=20 in Example.

Comparative Example

Meanwhile, as Comparative Example, a single answer model is prepared as a baseline, the single answer model having been trained under the same conditions as those of the models prepared as the machine reading comprehension model 26. In addition, as the upper limit of the performance in the single answer model, Oraclesingle is prepared. In the Oraclesingle, among multiple true answers assigned to each question, one answer having the highest value of F1 is extracted.

Similarly to Dua and others, EM (Exact Match) and F1 (macro-averaged) modified for evaluation of the DROP are used. In the EM, the evaluation value reaches 1 when all the answers included in the right solutions completely match the answers predicted by a model. In the F1, alignment is made between a right solution and a predicted answer, and after F1 is calculated for all combinations, standardization is performed, thus the evaluation value is maximized by obtaining the right amount of multiple answers.

Table 3 illustrates a result of conducting multiple answer QA (multi-span) of the DROP.

TABLE 3

| | multi-span | |
|---|---|---|
| Models | EM | F1 |
| BiDAF(♣) | 0 | 15.9 |
| QANet(◇) | 0 | 18.4 |
| $BERT_{BASE}$(▽) | 0 | 19.1 |
| $BERT_{LARGE}$(♠) | 0 | 23.4 |
| ♣(x20) + RC-rewriter | 3.25 | 27.2 |
| ◇(x20) + RC-rewriter | 3.80 | 28.2 |
| ▽(x20) + RC-rewriter | 2.89 | 28.8 |
| ♠(x20) + RC-rewriter | 5.61 | 33.2 |
| Oracle$_{single}$ | 0 | 42.0 |

As illustrated in Table 3, when techniques using a single answer model of the baseline and the RC-rewriter 28 are compared, it can be confirmed that F1 is improved by about 10 points in every models.

Furthermore, since each single answer model extracts only one answer, in all the models including the Oraclesingle, EM=0. In contrast, it has been confirmed that the technique of Example can correctly extract all answers in the context by the multiple answer QA with a maximum of 5.61%.

As described above, in the exemplary embodiment, it is possible to significantly improve the performance of the multiple answer QA without relying on a specific single answer model.

<Modification 1>

The number and type of single answer models used as the machine reading comprehension model 26 in the exemplary embodiment can be set in any way.

The inventors have confirmed that the performance is improved by increasing the number of single answer models, as compared with the condition in which the number of single answer models is minimized (N=1). At the same time, the inventors have confirmed that the performance tends to decrease with an excessive increase in the number of the models. Consequently, although preparation of a certain number of single answer models is needed to solve the multiple answer QA, improvement of the performance by increasing the number of models unlimitedly is not expected, and thus it is desirable to set an appropriate number of models. In general, the appropriate number may be greater than or equal to a desired number of answers, and may be less than or equal to an upper limit number which is set according to the desired number of answers.

In addition, in the exemplary embodiment, it is desirable that single answer models of different types rather than single answer models of the same type be combined.

Table 4 illustrates a result of comparison between the case where single answer models of different types are combined and the case where otherwise.

TABLE 4

| | multispan | |
|---|---|---|
| Models | EM | F1 |
| ♠(x20) + RC-rewriter | 5.61 | 33.2 |
| ♣ + ◇ + ♠ + RC-rewriter | 6.15 | 36.1 |

In Table 4, in order to unify the number of single answer models between the models to be compared, the number of models in a combination model is set to five, and totally 20 single answer models are used. In multi-span, when the combination model is compared with the combined model with the same structure, it has been confirmed that the performance is improved by 0.54 points for EM, and by 2.9 points for F1.

Consequently, in order to improve the correct solution rate, it is desirable that as the single answer models to be used as the machine reading comprehension model 26, various types of single answer models be combined rather than only those single answer models having the highest performance are used.

<Modification 2>

In the exemplary embodiment, text data such as context is used as the analysis target data. However, the present disclosure is similarly applicable to another data format, for instance, image data. When the analysis target data is image data, a pixel may be used as a token.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An answer generating device comprising:
an input that receives an input of analysis target data which is data to be questioned and analyzed;
a processor; and
an output,
the processor being configured to
upon input of the question and the analysis target data and by execution of a program,
extract answers to the question from the analysis target data using a plurality of single answer models prepared in advance, the answers each being extracted independently for each of the plurality of single answer models,
calculate a frequency of appearance of each of tokens in the extracted answers, and
extract a single answer or multiple answers based on the frequency of appearance, and output the single answer or multiple answers to the output.

2. The answer generating device according to claim 1, wherein the processor
uses a first threshold value and a second threshold value smaller than the first threshold value in determination,
wherein, in the determination, the processor
determines a token with the frequency of appearance greater than or equal to the first threshold value as the single answer and outputs the token determined as the single answer,
determines a token with the frequency of appearance less than the first threshold value and greater than or equal to the second threshold value as one of the multiple answers and outputs the token determined as the one of the multiple answers, and
does not select a token with the frequency of appearance less than the second threshold value as an answer.

3. The answer generating device according to claim 2, wherein the processor,
in a case where a same determination result is obtained for consecutive multiple tokens in the determination, continuously selects the tokens such that the selected tokens have a maximum length of sequence, and outputs the selected tokens instead of outputting each of the tokens as an output result.

4. The answer generating device according to claim 2, wherein the processor,
in a case where a processing target token is determined as the single answer and then a next processing token is determined as one of the multiple answers or as no answer, outputs only the processing target token determined as the single answer.

5. The answer generating device according to claim 1, wherein the processor
uses the plurality of single answer models greater than or equal in number to a number of the multiple answers.

6. The answer generating device according to claim 2, wherein the processor
uses the plurality of single answer models greater than or equal in number to a number of the multiple answers.

7. The answer generating device according to claim 3, wherein the processor
uses the plurality of single answer models greater than or equal in number to a number of the multiple answers.

8. The answer generating device according to claim 4, wherein the processor
uses the plurality of single answer models greater than or equal in number to a number of the multiple answers.

9. The answer generating device according to claim 1, wherein the plurality of single answer models each encode the question and the analysis target data to a distributed representation based on a deep learning method, and extracts an answer range with a maximum probability from the analysis target data by fully connected layers for estimating a start point and an end point of each of the answers based on the encoded distributed representation.

10. The answer generating device according to claim 2, wherein the plurality of single answer models each encode the question and the analysis target data to a distributed representation based on a deep learning method, and extracts an answer range with a maximum probability from the analysis target data by fully connected layers for estimating a start point and an end point of each of the answers based on the encoded distributed representation.

11. The answer generating device according to claim 3, wherein the plurality of single answer models each encode the question and the analysis target data to a distributed representation based on a deep learning method, and extracts an answer range with a maximum probability from the analysis target data by fully connected layers for estimating a start point and an end point of each of the answers based on the encoded distributed representation.

12. The answer generating device according to claim 4, wherein the plurality of single answer models each encode the question and the analysis target data to a distributed representation based on a deep learning method, and extracts an answer range with a maximum probability from the analysis target data by fully connected layers for estimating a start point and an end point of each of the answers based on the encoded distributed representation.

13. The answer generating device according to claim 5, wherein the plurality of single answer models each encode the question and the analysis target data to a distributed representation based on a deep learning method, and extracts an answer range with a maximum probability from the analysis target data by fully connected layers for estimating a start point and an end point of each of the answers based on the encoded distributed representation.

14. The answer generating device according to claim 6, wherein the plurality of single answer models each encode the question and the analysis target data to a distributed representation based on a deep learning method, and extracts an answer range with a maximum probability from the analysis target data by fully connected layers for estimating a start point and an end point of each of the answers based on the encoded distributed representation.

15. The answer generating device according to claim 7, wherein the plurality of single answer models each encode the question and the analysis target data to a distributed representation based on a deep learning method, and extracts an answer range with a maximum probability from the analysis target data by fully connected layers for estimating a start point and an end point of each of the answers based on the encoded distributed representation.

16. The answer generating device according to claim 8, wherein the plurality of single answer models each encode the question and the analysis target data to a distributed representation based on a deep learning method, and extracts an answer range with a maximum probability from the analysis target data by fully connected layers for estimating a start point and an end point of each of the answers based on the encoded distributed representation.

17. The answer generating device according to claim 1, wherein the plurality of single answer models are each learned using training data in which each question is assigned only a single answer.

18. The answer generating device according to claim 2, wherein the plurality of single answer models are each learned using training data in which each question is assigned only a single answer.

19. The answer generating device according to claim 1, wherein the analysis target data is text data, and
the tokens are each a word or a character string in the text data.

20. A non-transitory computer readable medium storing a program causing a computer to execute a process comprising:
inputting analysis target data which is data to be questioned and analyzed;
extracting answers to the question from the analysis target data using a plurality of single answer models prepared in advance, the answers each being extracted independently for each of the plurality of single answer models,
calculating a frequency of appearance of each of tokens in the extracted answer, and
extracting a single answer or multiple answers based on the frequency of appearance, and outputting the single answer or multiple answers.

* * * * *